(12) United States Patent
DeSanti et al.

(10) Patent No.: US 9,022,869 B1
(45) Date of Patent: May 5, 2015

(54) SYSTEM AND METHOD FOR MERGING USER ACCOUNTS

(71) Applicants: Brian DeSanti, San Bruno, CA (US); Travis Hawk, San Bruno, CA (US); Tim Ernst, Millbrae, CA (US); James Frier, San Francisco, CA (US); Steven Chin, Fremont, CA (US)

(72) Inventors: Brian DeSanti, San Bruno, CA (US); Travis Hawk, San Bruno, CA (US); Tim Ernst, Millbrae, CA (US); James Frier, San Francisco, CA (US); Steven Chin, Fremont, CA (US)

(73) Assignee: Kabam, Inc., San Francisco, CA (US)

( * ) Notice: Subject to any disclaimer, the term of this patent is extended or adjusted under 35 U.S.C. 154(b) by 256 days.

(21) Appl. No.: 13/715,888

(22) Filed: Dec. 14, 2012

(51) Int. Cl.
  *A63F 9/24* (2006.01)
  *G07F 17/32* (2006.01)
  *G06F 17/30* (2006.01)

(52) U.S. Cl.
  CPC ...... *G07F 17/3225* (2013.01); *G06F 17/30345* (2013.01)

(58) Field of Classification Search
  CPC ... A63F 13/00; A63F 2300/575; A63F 13/10; A63F 2300/8082; G07F 17/326; G07F 17/3281; G07F 17/3225; H04L 67/306
  USPC ........................................ 463/9, 42
  See application file for complete search history.

(56) References Cited

U.S. PATENT DOCUMENTS

| | | | |
|---|---|---|---|
| 5,768,519 A * | 6/1998 | Swift et al. ..................... | 709/223 |
| 8,019,797 B2 | 9/2011 | Hamilton, II et al. ........ | 707/809 |
| 2009/0198664 A1 * | 8/2009 | Hamilton et al. ................. | 707/4 |
| 2010/0333031 A1 * | 12/2010 | Castelli et al. ................ | 715/835 |
| 2011/0185057 A1 | 7/2011 | Waugaman et al. .......... | 709/224 |
| 2013/0061157 A1 * | 3/2013 | Hamilton et al. ............. | 715/757 |

OTHER PUBLICATIONS

Character Transfer FAQ, https://us.battle.net/support/en/article/character-transfer-faq, updated: Nov. 19, 2012 Article ID: 200474, 4 pages printed Nov. 27, 2012.
Free Character Transfers Have Ended, by Blizzard Entertainment, Sep. 26, 2012 7:30 PM PDT, http://us.battle.net/wow/en/blog/7384661/Free_Character_Transfers_Available-9_26_2012, 7 pages, printed Nov. 27, 2012.

* cited by examiner

*Primary Examiner* — Steve Rowland
(74) *Attorney, Agent, or Firm* — Pillsbury Winthrop Shaw Pittman LLP

(57) ABSTRACT

Disclosed herein is technology for merging a two separate user accounts. The virtual content in the accounts can be designated at mergeable content and managed content. The user chooses one account to the primary account and the mergeable content from the second user account is merged with the content—of the same type—of the first user account. The managed content is not simply merged into the designated account. Instead, certain components of the virtual content are selected to be migrated to the target account until a maximum number of components are reached.

12 Claims, 3 Drawing Sheets

SYSTEM AND METHOD FOR MERGING USER ACCOUNTS

FIELD

The disclosure relates to video games and more specifically, a way of merging user accounts.

BACKGROUND

Many video games are run on servers that are remote to the user's PC or console. Each instance of a game may run on a separate server, and a user logs into a "world" or "realm," with each realm executing on its own separate server. There are also scenarios where a given realm may be run on multiple serves and is load-balanced across the physical machines.

Servers that run a game require administrative maintenance and upkeep by the game's provider, e.g., typically the game developer or game publisher. Over time, the number of participants in a game may decline or a game provider may choose to direct its resources elsewhere. When this happens, oftentimes the game provider will consolidate the equipment—computers, servers, software, networking equipment—that runs the game. When this happens, user accounts on realms that run on that equipment may be moved to a different server, e.g., rather than having three realms with only a few active users each, the game provider may consolidate the three realms into one realm, thereby migrating all of the active users to the remaining realm.

SUMMARY

When different users on different servers are migrated onto one server, there are typically no conflicts as far as managing user accounts. When one user has accounts on separate servers though and the accounts on the separate servers are merged onto one server, conflicts may arise as to what aspects of each of the accounts will be kept. One way to solve this is to have the user select one of the accounts to remain and the rest are deleted. This is not ideal though because the user is being forced to delete account information he or she may not wish to. A more preferable approach is to merge the information from one account to another and for components of the account that are not directly mergeable, provide a way for the user to maximize the number of components that are retained.

One aspect of the disclosure relates to a method, executed on a computer processor, for merging virtual content associated with a first user account and virtual content associated with a second user account for the same user, where the first user account and second user account are logically separate, the method may involve receiving an instruction from the user via an interface to preserve the virtual content from the first user account. Then, in some versions, a set of managed components—those where the merging must be managed—may be identified in the virtual content from the first user account and in the virtual content from the second user account.

In some implementations, a maximum number of managed components from the second user account may be determined. In some versions, the maximum number of components in the second set of managed components to be merged involves determining a maximum set size of the managed components from the first user account and subtracting the number of managed components from the first user account from the maximum set size.

In some implementations, a ranking metric may be determined that quantifies a relative value. The set of managed components from the second user account may be ranked based on the ranking metric, and components from the set of managed components from the second user account may be merged into the first set of managed components until the maximum number of managed components is reached. Typically, the components from the second user account to be merged are automatically selected based on the ranking metric.

In some versions, the method may also involve identifying a set of mergeable components, different than the set of managed components, of a particular content type in the virtual content from the first user account. A set of mergeable components in the second user account, different than the set of managed components, may also be identified, where the content type of the mergeable components is the same content type as the set of mergeable components from the first user account. Then the set of mergeable components from the second user account are merged into the set of mergeable components from the first user account.

In some versions, the first virtual content and the second virtual content are merged into a third user account rather than merged into the first user account. In these versions, the third user account is created, the first set of managed components are merged into the third user account and then the components from the second set of managed components are merged into the third user account until the maximum number of managed components is reached. In some cases, which components from the second set of managed components are automatically selected based on the ranking metric. The mergeable components of the first user account and the second user account may also be merged into the third user account.

Another aspect of the disclosure relates to a system for administering an online game. The system may include one or more processors configured to execute computer program modules. The computer program modules may be a first user account module, a second user account modules, an interface module, a ranking module, a merging module, and/or other modules.

In some versions the first user account module may be configured with a first virtual content associated with a user, where the first virtual content includes a first set of mergeable components and a first set of managed components. The second user account module may be configured with a second virtual content associated with the user, the second virtual content also including a second set of mergeable components and a second set of managed components. In some implementations, the interface module may be configured to receive an instruction from the user to preserve the first virtual content. The ranking module may be configured to determine a ranking metric that quantifies a relative value and may be further configured to rank the set of managed components from the second user account based on the ranking metric.

In some implementations, the system may also include a merging module which may be configured to identify a maximum number of components of the set of managed components from the second user account to be merged and to merge managed components from the second user account into managed components from the first user account until the maximum number of managed components is reached. In some versions, the managed components from the second user account are merged into the managed components of the first user account in the order provided by the ranking module.

In some versions, the merging module may configured to identify the maximum number of components in the second set of managed components to be merged by determining a maximum set size of the managed components from the first user account and subtracting the number of managed components from the first user account from the maximum set size.

In some versions, the virtual content from the first user account also includes a set of mergeable components and the virtual content from the second user account also includes a set of mergeable components. In these versions, the merging module may be configured to merge the set of mergeable components from the second user account into the mergeable components from the first user account.

In some implementations of the system, there is a third user account that the virtual content from the first user account and the second user account are merged into, rather than merging the virtual content from the second user account into the first user account. In these implementations, the merging module may be configured to merge components from the first set of managed components into the third user account, and to merge components from the second set of managed components into the third user account until the maximum number of managed components is reached. In some implementations, the components from the second set of managed components are merged into the third user account in the order provided by the ranking module. The merging module may further be configured to merge mergeble components in the first virtual content and mergeable components in the second virtual content into the third user account as well.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
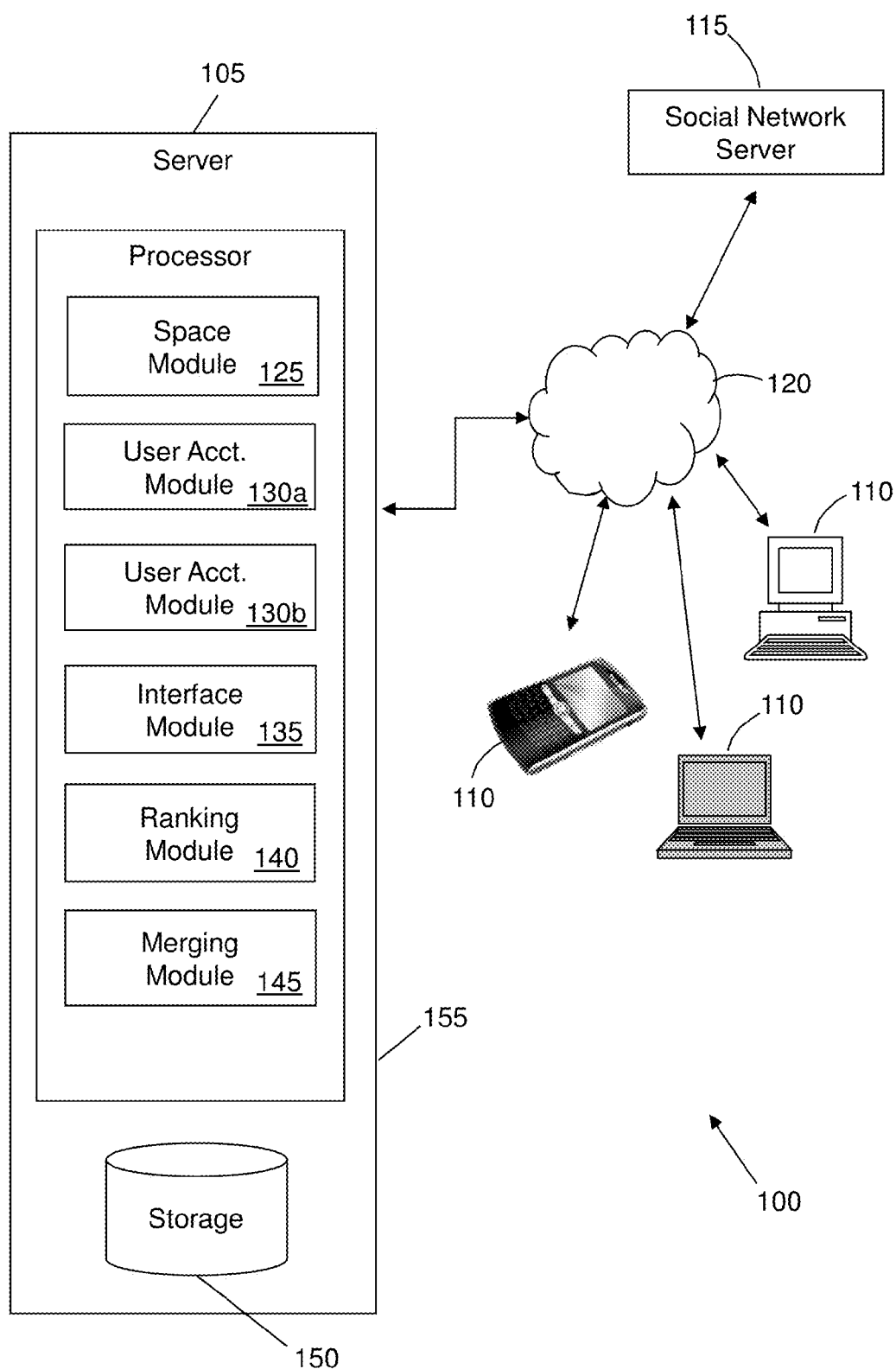
FIG. 1 illustrates a system configured to administer an online game.

FIG. 1 illustrates a system 100 configured to administer an online game. System 100 may enable users to play the online game. In some implementations, system 100 may include a server 105. Server 105 may be configured to communicate via one or more electronic communication links with one or more client computing platforms 110 and/or social networking servers 115 according to a client/server architecture communicated over a network 120, e.g., the Internet, wide area network (WAN), local area network (LAN), or the like. The users may access system 100 and/or the online game via client computing platforms 110.

Server 105 may be configured to execute one or more computer program modules. The one or more computer program modules may include one or more of a a space module 125, a user account module 130a, 130b, an interface module 135, a ranking module 140, a merging module 145, and/or other modules.

Space module 125 may be configured to host a virtual space for access by users via client computing platforms 110. The users may participate in the online game within the virtual space. Hosting the virtual space may include executing an instance of the virtual space, and implementing the instance of the virtual space to determine view information representing views of the virtual space. The view information may then be communicated from server 105 to client computing platforms 110 to facilitate presentation of the views to the users. The views may be presented to the users within user interfaces of applications being executed on client computing platforms 110 (e.g., web browsers). In some implementations, individual client computing platforms 110 may execute instances of the virtual space. In such implementations, client computing platforms 110 may generate views from a locally executed instance, or may receive view information from another client computing platform 110 in a peer-to-peer configuration. Space module 125 may execute an instance of the virtual space used to update, authenticate, confirm results from, and/or work in other ways with the instances of the virtual space executed locally on client computing platforms 110 to provide a virtual space in which users can interact with each other.

In some implementations, the virtual space (and/or the online game) may be accessed through one of a plurality of different social networking platforms provided by one of social network servers 115. The term "social networking platform" is used generally, and the invention is not limited to traditional social networking platforms. Any platform that can provide games or virtual spaces and allows users to interact, e.g., Kabam.com, Steam, Kongregate, and the like, are within the scope of the invention with respect to "social networking platforms." In such implementations, accessing the virtual space through a given social networking platform may include logging into the virtual space through the given social networking platform, receiving a view of the virtual space within a user interface associated with the given social networking platform (e.g., within a web page hosted by the given social networking platform), and/or other mechanisms for accessing the virtual space from the given social networking platform.

The users may participate in the virtual space (and/or the online game that takes place therein) by inputting input commands to their respective client computing platforms 110 that request an action to be taken within the instance of the virtual space (e.g., manipulate an object, build a building, control a character, and/or other actions). The input commands may then be implemented in the virtual space through the initiation of the requested actions (e.g., by space module 125 on server 105, in one or more instances of the virtual space on client computing platform(s) 110, etc.).

A virtual space may comprise a simulated space that is accessible by users via clients (e.g., client computing platforms 110) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout or a 3-dimensional-like but not fully 3-dimensional (i.e., "2.5D") layout. An instance of a virtual space may be persistent. That is, the instance of the virtual space may continue to exist whether or not any given user (or set of users) is currently logged in and/or receiving view information.

The above description of virtual spaces is not intended to be limiting. Space module 125 may be configured to express the virtual space in a more limited or more rich manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters, buildings, or a realm present at the location. In some implementations of the online game, buildings or an entire realm may perform actions in a manner similar to the way characters perform actions in other games, e.g., attack other players, other player's characters, other player's buildings, or perform similar defensive actions. Additionally or alternatively, buildings or a realm may generate resources or units of characters that can perform actions on behalf of the user. Text may be used to express the actions of the characters, buildings, or realm present at the location (and/or effects of the actions or properties), and/or actions of the characters, buildings or realm (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space module 125, users may control characters, buildings, or a realm to interact with the virtual space and/or each other. As used herein, the term "character", "building", or "realm" may refer to an object (or group of objects) present in the virtual space that represents an individual user. The characters, buildings, or realms may be controlled by the user with which it is associated. The characters, buildings, or realm may interact with the virtual space (e.g., non-player characters in the virtual space, other objects in the virtual space), or the characters, buildings, or realms may be relatively static visually within views of virtual space. The characters, buildings, or realms representing a given user may be created and/or customized by the given user. The characters, buildings, or realms may have an "inventory" of virtual goods and/or currency that the user can use (e.g., by manipulation of a character, a building, or a realm or other user controlled element, and/or other items), display, gift, and/or otherwise interact with within the virtual space.

In some implementations, there are two or more user account modules 130a, 130b (collectively 130). User account modules 130 may be configured to manage user accounts associated with individual users. The user accounts may include information stored by server 105, one or more of the client computing platforms 110, and/or other storage locations. The user account modules are for the most part identical in functionality, but store user account information for different accounts. In some implementations the two or more user account modules 130 are implemented as one account module 130 and the account information for the different accounts is segregated logically, e.g., is stored in separate databases, separate rows in a database, in separate files, or in separate sections of a file.

The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

In some implementations, the first user account module 130a may be configured with content associated with a user, e.g., the user's virtual items or goods, troops, and/or resources. The first virtual content has mergeable components and managed components. The mergeable components and the managed components are different components. The second user account 130b module may also be configured with virtual content associated with the user, but for a separate account. As above, the second virtual content may include mergeable components and managed components, which are separate components. For example, in some implementations, troops, virtual currency and/or objects and other "stackable" items such as gems, "Lucky Tokens", "Aetherstones," are mergeable components. Managed components may be items that are unique in the virtual space or unique to the user, e.g., a "Wondrous Throne of Rage +5."

In some implementations, the user account module 130 includes information about characters or realms associated with the user account. The term "realm" may apply to a portion of a game map, one or more cities, towns or villages, or natural resources, e.g., wildernesses, forests, bodies of water, mineral deposits, or combinations of these. The information included in the user accounts may include characters, buildings, or realms that are associated with the user in the virtual space. The characters, buildings, or realms may be persistent within the virtual space. The characters, buildings, or realms may be controllable by the given user in the virtual space. Controlling the characters, buildings, or realms may enable the given user to advance within the online game (e.g., as the user progress through the game content available in the virtual space). The given user may be able to control a plurality of the characters, buildings, or realms within the virtual space simultaneously. The given user may only be able to play one of the characters, buildings, or realms in the online game in the virtual space at a time. Individual ones of the one or more characters, buildings, or realms may be unique within the virtual space (e.g., have a unique appearance, a unique name, a unique score or inventory, and/or be unique in other ways). The character(s), buildings, or realms for which information is saved in the user profile of the given user may be exclusive to the given user. That is, the given user may be the only user that controls those character(s), buildings, or realms. The information included in the user account for a given character, building, or realm may include one or more of a progress level, a status, a score, an inventory, and/or other information.

In some implementations, interface module 135 may be configured to receive an instruction from the user to preserve the virtual content stored in one of the user account modules 130. The interface module presents the option of which account will remain to the user via, e.g., a graphical user interface. The user then indicates the account to remain via, e.g., keyboard, mouse, or touchscreen input. The unselected accounts are then merged into the selected account as described herein.

In some versions, ranking module 140 may be configured to determine a ranking metric that quantifies a relative value, e.g., a ranking system of zero to one hundred, with zero being the worst and one hundred being the best, or from A (best) to F (worst), and similar ranking schemes. The ranking assigned may be based on a competitive metric in the game, e.g., "Might", the component's rarity in the game, value in virtual currency, bonuses conferred on the user's in-game persona, a combination of the foregoing, or similar game mechanic-oriented metrics. The ranking module 140 may further be configured to rank the managed components, e.g., in the second user account module, based on the ranking metric so that the managed components in the second user account module are ranked from best to worst, e.g., the "best" items conferring the most of the competitive metric, the "best" being the most valuable in terms in virtual currency, and the like.

In some versions, merging module 145 may be configured to merge the second mergeable components from the second user account into the mergeable components of the first user account. For example, in implementations, where troops are a mergeable component, the first user account has fifty troops and the second user account has twenty five troops. Merging module 145 may be configured to merge the troops from the second user account into the first user account such that after the merge, the first user account has seventy five troops. Additionally or alternatively, mergeable components from two accounts can be merged into a new third user account, thereby preserving the first two accounts. The first two accounts may then be deactivated and archived in case their information is ever needed and the user can play the game using the new third user account. Although the example uses troops as a broad category, the merged components could be of the same type but different components. For example, if the first user account had fifty infantrymen and the second user account had twenty five cavalry, then after the merge, the first user account would have fifty infantrymen and twenty five cavalry. In some versions, this is accomplished by copying data structures from one user account to another. In other versions, the rows in a database that represent the mergeable components of the second user account are appended to or inserted into the database entries that are associated with the first user account.

In some implementations, merging module 145 may be configured to identify a maximum number of managed components that can to be merged. In some implementations, this may be accomplished by the merging module 145 determining a maximum set size of the managed components from the first user account and subtracting the number of managed components in the first user account from the maximum set size. For example, if the first user account can store a maximum of sixty managed components and the first user account has only forty managed components, the maximum number of managed components in the second user account that can be merged is twenty.

The merging module 145 may also be configured to merge components from the managed components of the second user account into the managed components of the first user account until the maximum number of managed components is reached. Typically the managed components from the second user account are merged into the managed components of the first user account in the order provided by the ranking module 140. Continuing the above example, if the second user account has thirty managed components, then the twenty "best" components (because there is only room for twenty components) are merged into the managed components of the first user account. Additionally or alternatively, the managed components from the two accounts can be merged into a new third user account, thereby preserving the first two accounts. The first two accounts may then be deactivated and archived in case their information is ever needed and the user can play the game using the new third user account.

A given client computing platform 110 may include one or more processors, and electronic display, a control interface, and/or other components. The one or more processors may be configured to execute computer program modules. The computer program modules may be configured to enable or user associated with the given client computing platform 110 to interface with system 100, and/or provide other functionality attributed herein to client computing platforms 110. For example, the computer program modules may include a view module configured to receive view information from server 105 (e.g., generated by space module 125), and to present a view of the virtual game environment (e.g., as described above) based on the received view information. This may facilitate participation by the user of the given client computing platform 110 in the game taking place in the virtual game environment. By way of non-limiting example, the given client computing platform 110 may include one or more of a desktop computer, a laptop computer, a handheld computer, a tablet computing platform, a NetBook, a Smartphone, a gaming console, and/or other computing platforms.

Server 105 may include electronic storage 150, one or more processors 155, and/or other components. Server 105 may include communication lines, or ports to enable the exchange of information with a network and/or other computing platforms. Illustration of server 105 in FIG. 1 is not intended to be limiting. Server 105 may include a plurality of hardware, software, and/or firmware components operating together to provide the functionality attributed herein to server 105. For example, server 105 may be implemented "in the cloud" by a plurality of computing platforms operating together as server 105.

Electronic storage 150 may comprise electronic storage media that electronically stores information. The electronic storage media of electronic storage 150 may include one or both of system storage that is provided integrally (i.e., substantially non-removable) with server 105 and/or removable storage that is removably connectable to server 105 via, for example, a port (e.g., a USB port, a firewire port, etc.) or a drive (e.g., a disk drive, etc.). Electronic storage 150 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 150 may include one or more virtual storage resources (e.g., cloud storage, a virtual private network, and/or other virtual storage resources). Electronic storage 150 may store software algorithms, information determined by processor 155, information received from server 105, information received from client computing platforms 110, and/or other information that enables server 105 to function as described herein.

Processor(s) 155 is configured to provide information processing capabilities in server 105. As such, processor 155 may include one or more of a digital processor, an analog processor, a digital circuit designed to process information, an analog circuit designed to process information, a state machine, and/or other mechanisms for electronically processing information. Although processor 155 is shown in FIG. 1 as a single entity, this is for illustrative purposes only. In some implementations, processor 155 may include a plurality of processing units. These processing units may be physically located within the same device, or processor 155 may represent processing functionality of a plurality of devices operating in coordination. The processor 155 may be configured to execute modules 125, 130, 135, 140, and/or 145. Processor 155 may be configured to execute modules 125, 130, 135, 140, and/or 145 by software; hardware; firmware; some combination of software, hardware, and/or firmware; and/or other mechanisms for configuring processing capabilities on processor 155.

It should be appreciated that although modules 125, 130, 135, 140, and/or 145 are illustrated in FIG. 1 as being co-located within a single processing unit, in implementations in which processor 155 includes multiple processing units, one or more of modules 125, 130, 135, 140, and/or 145 may be located remotely from the other modules. As a non-limiting example, some or all of the functionality attributed to modules 125, 130, 135, 140, and/or 145 may be provided "in the cloud" by a plurality of processors connected through a network. The description of the functionality provided by the different modules 125, 130, 135, 140, and/or 145 herein is for illustrative purposes, and is not intended to be limiting, as any of modules 125, 130, 135, 140, and/or 145 may provide more or less functionality than is described. For example, one or more of modules 125, 130, 135, 140, and/or 145 may be eliminated, and some or all of its functionality may be provided by other ones of modules 125, 130, 135, 140, and/or 145. As another example, processor 155 may be configured to execute one or more additional modules that may perform some or all of the functionality attributed below to one of modules 125, 130, 135, 140, and/or 145. Modules 125, 130, 135, 140, and/or 145 may execute on one server, on multiple distinct servers, there may be a server for each respective module, or the modules may be combined in any number of permutations to execute on any number of servers. Furthermore, server 105 may be a hardware server or it may be a process with a designated memory space executed on a hardware processor.

It will be appreciated that illustration in FIG. 1 and the description herein of modules 125, 130, 135, 140, and/or 145 being provided for implementation with a single online game and/or virtual space (e.g., provided by space module 125) is not intended to be limiting. In some implementations, one or more of modules 125, 130, 135, 140, and/or 145 may provide the functionality described herein for a plurality of separate online games and/or virtual spaces (e.g., provided by a plurality of space modules). Such implementations may reduce redundancy of an entity that provides a plurality of different online games and/or virtual spaces to users through the social networking platforms. In such implementations, the one or more of modules 125, 130, 135, 140, and/or 145 that are provided to serve a plurality of different online games (and/or virtual spaces) may be executed in a separate server from the server(s) executing the space modules.

Figure 2:
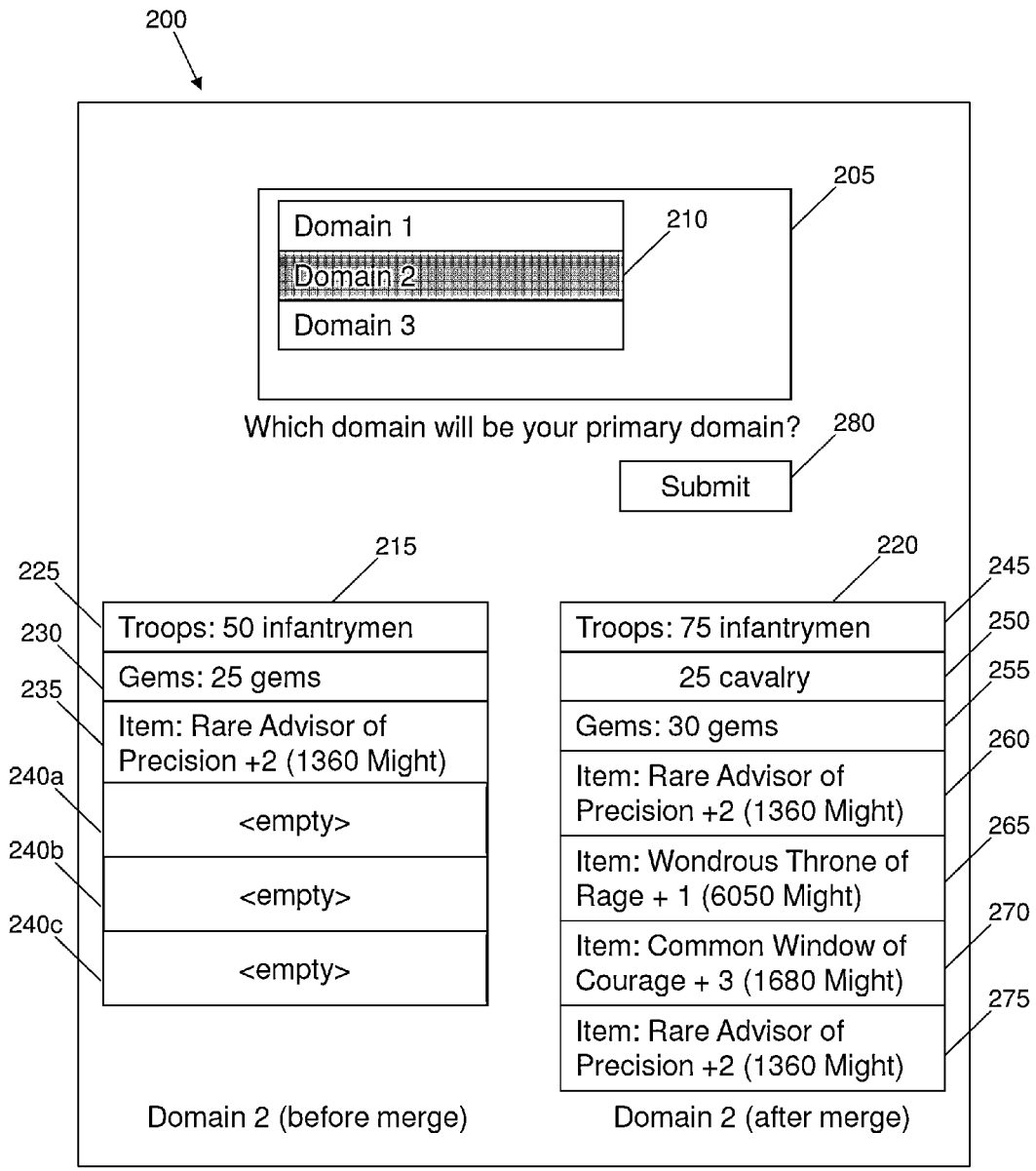
FIG. 2 depicts an example of an interface presented to a user for selecting which domain will be preserved.

FIG. 2 depicts an example of an interface 200 presented to a user for selecting which domain will be preserved. The interface 200 presents a selection box 205 for the user to choose which domain will be the primary domain and will be preserved. In the example, Domain 2 has been selected (indicated by the highlighting 210). In some embodiments, the selection of which domain will be the primary one is based on which domain the user logged into most recently.

In FIG. 2, the before and after windows 215, 220 respectively, show the user what the selected domain has before and will have after the domain merge is complete. As shown, before the merge, the selected domain has fifty infantrymen 225, twenty-five gems 230, a "Rare Advisor of Precision +2" 235 and three slots 240a, 240b, 240c available for items. After the merger, the selected domain will have seventy five infantry men 245 (fifty from before the merger and an additional twenty five from the merged domain) plus an additional twenty five cavalry 250. The selected domain will also have an additional five gems, bringing the total to thirty gems 255. The troops and gems represent mergeable components. The items shown represent managed components. Before the merge, the selected domain had a "Rare Advisor of Precision +2" 235. After the merge, the selected domain will have the "Rare Advisor of Precision +2" 260 from before the merge, as well as a "Wondrous Throne of Rage +1" 265, a "Common Window of Courage +3" 270, as well as a second "Rare Advisor of Precision +2" 275. The two "Rare Advisors of Precision +2" 260, 275 do not stack (like the infantrymen) and are separate items; this is because they are managed components. The selected domain also receives items according to, in this embodiment, Might, and the three new items 265, 270, and 275 are merged into the selected account according to their respective Might scores until the available empty slots are filled. If the user approves of what the selected domain will look like, the user may then click submit 280. In implementations where the selection of which domain will be preserved is made by the user logging into a domain, the interface 200 and the before and after windows 215, 220 may not be shown. In those implementations, there is no submit button 280 and the merge will happen automatically or at a scheduled time.

Figure 3:
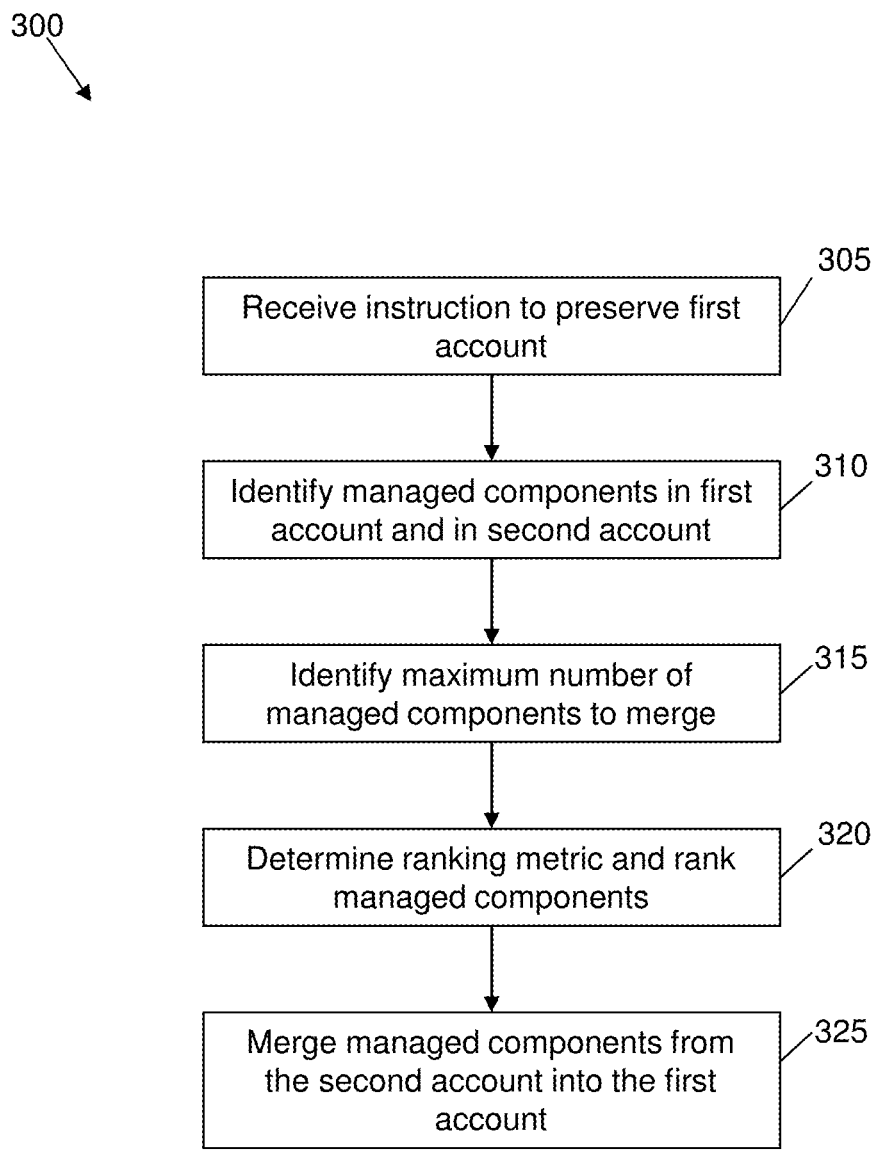
FIG. 3 depicts a method, executed on a computer processor, for merging virtual content in a first user account associated with virtual content associated with a second user account.

FIG. 3 depicts a method 300, executed on a computer processor, e.g., processor 155, for merging a virtual content associated with a first user account associated and virtual content associated with a second user account, where the first user account and second user account are logically separate. The method 300 begins at operation 305 where an instruction from the user is received via an interface to preserve the virtual content from the first user account. At operation 310, a set of managed components in the virtual content from the first user account and a set of managed components in the virtual content from the second virtual content are identified, e.g., by the merging module 145.

Then, at operation 315, a maximum number of components of the managed components from the second user account are identified to be merged. In some implementations, this may be done by determining a maximum set size of the set of managed components from the first user account and then subtracting the number of managed components in the set from the first user account from the maximum set size.

At operation 320, a ranking metric is determined, e.g., by ranking module 140 that quantifies a relative value for the components. Then the set of managed components from the second user account are ranked based on the ranking metric. After the ranking, the components from the managed components of the second user account are merged at operation 325 into the managed components of the first user account until the maximum number of managed components is reached. In some implementations, which managed components from the second user account are merged are automatically selected based on the ranking metric assigned to each.

In some implementations, the method 300 may also include (not shown) identifying a set of mergeable components in the first user account of a particular content type and identifying a second set of mergeable components of the same content type as the set of mergeable components from the first user account and then merging the set of mergeable components from the second user account into the mergeable components of the first components.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method, executed on a computer processor, for merging a first virtual content associated with a first user account associated with a user and a second virtual content associated with a second user account associated with the user, wherein the first user account and second user account are logically separate, the method comprising:
receiving, via an interface interacted with by the user through a client computing platform associated with the user, an instruction from the user to preserve the first virtual content;
identifying a first set of managed components in the first virtual content that are stored on electronic storage media associated with the first user account and a second set of managed components in the second virtual content that are stored on electronic storage media associated with the second user account;
identifying a maximum number of components of the second set of managed components to be merged;
determining, by the computer processor, a ranking metric that quantifies a relative value;
ranking, by the computer processor, the second set of managed components based on the ranking metric; and
merging components from the second set of managed components from the stored electronic storage media associated with the second user account into the first set of managed components stored in electronic storage media associated with the second user account until the maximum number of managed components is reached, such that the first set of managed components and the merged managed components from the second set of components are stored in the electronic storage media associated with the first user account, wherein which components from the second set of managed components to be merged are automatically selected based on the ranking metric.

2. The method of claim 1 further comprising:
identifying a first set of mergeable components, different than the first set of managed components, of a particular content type in the first virtual content and a second set of mergeable components, different than the second set of managed components, of the same content type as the first set of mergeable components in the second virtual content; and
merging the second set of mergeable components into the first set of mergeable components.

3. The method of claim 1 wherein identifying the maximum number of components in the second set of managed components to be merged comprises:
determining a maximum set size of the first set of managed components; and
subtracting the number of managed components in the first set from the maximum set size.

4. A system for administering an online game, the system comprising:
one or more processors configured to execute computer program modules, the computer program modules comprising:
a first user account module configured with a first virtual content associated with a user stored on electronic storage media associated with the first user account, the first virtual content comprising a first set of mergeable components and a first set of managed components;
a second user account module configured with a second virtual content associated with the user stored on electronic storage media associated with the second user account, the second virtual content comprising a second set of mergeable components and a second set of managed components;
an interface module, configured to receive an instruction from the user to preserve the first virtual content, wherein the instruction is received from the user through a client computing platform associated with the user;
a ranking module configured to determine a ranking metric that quantifies a relative value and further configured to rank the second set of managed components based on the ranking metric; and
a merging module configured to:
identify a maximum number of components of the second set of managed components to be merged; and
merge components from the second set of managed components, stored in electronic storage media associated with the second user account, into the first set of managed components until the maximum number of managed components is reached, such that the first set of managed components and the merged managed components from the second set of components are stored in the electronic storage media associated with the first user account, wherein the components from the second set of managed components are merged into the first set of managed components in the order provided by the ranking module.

5. The system of claim 4 wherein the merging module is configured to identify the maximum number of components in the second set of managed components to be merged by:
determining a maximum set size of the first set of managed components; and
subtracting the number of managed components in the first set from the maximum set size.

6. The system of claim 4 wherein:
the first virtual content further comprises a first set of mergeable components;
the second virtual content comprises a second set of mergeable components; and
the merging module is further configured to merge the second set of mergeable components into the first set of mergeable components.

7. A method, executed on a computer processor, for merging a first virtual content associated with a first user account associated with a user and a second virtual content associated with a second user account associated with the user into a third user account, wherein the first user account and second user account are logically separate, the method comprising:

receiving, via an interface interacted with by the user through a client computing device associated with the user, an instruction from the user to preserve the first virtual content;

identifying a first set of managed components in the first virtual content stored in electronic storage media associated with the first user account and a second set of managed components in the second virtual content stored in electronic storage media associated with the second user account;

identifying a maximum number of components of the second set of managed components to be merged;

determining a ranking metric that quantifies a relative value;

ranking the second set of managed components based on the ranking metric;

creating the third user account;

merging the first set of managed components into the third user account, such that the first set of managed components are stored on electronic storage media associated with the third user account;

merging components from the second set of managed components into the third user account until the maximum number of managed components is reached, such that the merged components from the first set of managed components and the merged components from the second set of managed components are stored in the electronic storage media associated with the third user account, wherein which components from the second set of managed components to be merged are automatically selected based on the ranking metric.

8. The method of claim 7 further comprising:

identifying a first set of mergeable components, different than the first set of managed components, of a particular content type in the first virtual content and a second set of mergeable components, different than the second set of managed components, of the same content type as the first set of mergeable components in the second virtual content; and merging the first set of mergeable components and the second set of mergeable components into the third user account.

9. The method of claim 7 wherein identifying the maximum number of components in the second set of managed components to be merged comprises:

determining a maximum set size of the first set of managed components; and subtracting the number of managed components in the first set from the maximum set size.

10. A system for administering an online game, the system comprising:

one or more processors configured to execute computer program modules, the computer program modules comprising:

a first user account module configured with a first virtual content associated with a user stored on electronic storage media associated with the first user account, the first virtual content comprising a first set of mergeable components and a first set of managed components;

a second user account module configured with a second virtual content associated with the user stored on electronic storage media associated with the second user account, the second virtual content comprising a second set of mergeable components and a second set of managed components;

a third user account module configured to store a third virtual content associated with the user on electronic storage media associated with the third user account, the third virtual content configured to comprise a third set of mergeable components and a third set of managed components;

an interface module, configured to receive an instruction from the user to preserve the first virtual content, wherein the user provides the instruction by interacting with an interface through a client computing device associated with the user;

a ranking module configured to determine a ranking metric that quantifies a relative value and further configured to rank the second set of managed components based on the ranking metric; and a merging module configured to:

identify a maximum number of components of the second set of managed components to be merged; and merge components from the first set of managed components into the third user account;

merge components from the second set of managed components into the third user account until the maximum number of managed components is reached such that the merged first set of managed components and the merged set of managed components are stored on the electronic storage media associated with the third user account, wherein the components from the second set of managed components are merged into the third user account in the order provided by the ranking module.

11. The system of claim 10 wherein the merging module is configured to identify the maximum number of components in the second set of managed components to be merged by:

determining a maximum set size of the first set of managed components; and subtracting the number of managed components in the first set from the maximum set size.

12. The system of claim 10 wherein:

the first virtual content further comprises a first set of mergeable components;

the second virtual content comprises a second set of mergeable components; and the merging module is further configured to merge the first set of mergeable components into the third user account and merge the second set of mergeable components into the third user account.

* * * * *